(12) United States Patent
Musial

(10) Patent No.: US 10,306,046 B2
(45) Date of Patent: May 28, 2019

(54) METHOD AND DEVICE FOR EXTERNAL OPERATION OF A DEVICE

(71) Applicant: VOLKSWAGEN AG, Wolfsburg (DE)

(72) Inventor: Marek Musial, Berlin (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/294,958

(22) Filed: Oct. 17, 2016

(65) Prior Publication Data

US 2017/0111487 A1 Apr. 20, 2017

(30) Foreign Application Priority Data

Oct. 16, 2015 (DE) .................. 10 2015 220 229

(51) Int. Cl.
| | |
|---|---|
| *B60R 25/24* | (2013.01) |
| *H04M 1/725* | (2006.01) |
| *H04B 1/3822* | (2015.01) |
| *H04L 9/32* | (2006.01) |
| *H04L 29/06* | (2006.01) |
| *H04W 12/06* | (2009.01) |
| *H04W 4/80* | (2018.01) |
| *G07C 9/00* | (2006.01) |
| *B60W 30/06* | (2006.01) |

(52) U.S. Cl.
CPC ........ *H04M 1/7253* (2013.01); *H04B 1/3822* (2013.01); *H04L 9/3234* (2013.01); *H04L 9/3271* (2013.01); *H04L 63/0442* (2013.01); *H04L 63/0807* (2013.01); *H04W 4/80* (2018.02); *H04W 12/06* (2013.01); *B60R 25/24* (2013.01); *B60W 30/06* (2013.01); *G07C 9/00* (2013.01); *H04L 2209/84* (2013.01)

(58) Field of Classification Search
CPC ....................................... B60R 25/24
See application file for complete search history.

(56) References Cited

U.S. PATENT DOCUMENTS

| | | | | |
|---|---|---|---|---|
| 2002/0180273 | A1* | 12/2002 | Konno ............... | B60R 25/02 307/10.2 |
| 2005/0031100 | A1* | 2/2005 | Iggulden ............ | B60R 16/0231 379/102.03 |
| 2005/0046545 | A1* | 3/2005 | Skekloff ............. | B60R 25/24 340/5.61 |
| 2005/0277438 | A1* | 12/2005 | Tilk .................. | B60R 25/2063 455/556.1 |

(Continued)

FOREIGN PATENT DOCUMENTS

| | | |
|---|---|---|
| CN | 103138789 A | 6/2013 |
| CN | 103209259 A | 7/2013 |

(Continued)

OTHER PUBLICATIONS

Search Report from German Patent Application No. 10 2015 220 229.1; dated Jul. 1, 2016.

*Primary Examiner* — David Bilodeau

(74) *Attorney, Agent, or Firm* — Barnes & Thornburg LLP

(57) ABSTRACT

A method for external use of a device having a wireless communication interface by a program of a mobile device. External use is possible only when a key device serving as an authentication token communicates with the program. This increases the security of an entry method for a vehicle.

13 Claims, 2 Drawing Sheets

(56) References Cited

U.S. PATENT DOCUMENTS

| | | | |
|---|---|---|---|
| 2008/0127926 A1* | 6/2008 | Kim | B60R 25/04 |
| | | | 123/179.2 |
| 2011/0112969 A1 | 5/2011 | Zaid et al. | |
| 2013/0099892 A1 | 4/2013 | Tucker et al. | |
| 2013/0222133 A1* | 8/2013 | Schultz | G08G 1/205 |
| | | | 340/539.13 |
| 2013/0234827 A1* | 9/2013 | Tomita | G08C 23/04 |
| | | | 340/5.61 |
| 2014/0169564 A1* | 6/2014 | Gautama | G07C 9/00309 |
| | | | 380/270 |
| 2014/0333525 A1* | 11/2014 | Gromes, Sr. | G06F 3/01 |
| | | | 345/156 |
| 2016/0148450 A1* | 5/2016 | Ohshima | B60R 25/2018 |
| | | | 340/5.61 |
| 2017/0120867 A1* | 5/2017 | Beauvais | B60R 25/24 |
| 2018/0039264 A1* | 2/2018 | Messner | G06K 9/00812 |

FOREIGN PATENT DOCUMENTS

| | | |
|---|---|---|
| CN | 203142571 U | 8/2013 |
| CN | 103313364 A | 9/2013 |
| DE | 102010037271 A1 | 2/2012 |
| DE | 102010061111 A1 | 6/2012 |
| DE | 102012007984 A1 | 3/2013 |
| DE | 102013203950 A1 | 9/2013 |
| DE | 102012107000 A1 | 2/2014 |
| DE | 102012017934 A1 | 3/2014 |
| DE | 102012024614 A1 | 7/2014 |
| DE | 102013002281 A1 | 8/2014 |
| DE | 102014204225 A1 | 9/2014 |
| DE | 102013105022 A1 | 11/2014 |
| DE | 102013217445 A1 | 2/2015 |
| DE | 102014202713 A1 | 8/2015 |
| WO | 2015062832 A1 | 5/2015 |

* cited by examiner

METHOD AND DEVICE FOR EXTERNAL OPERATION OF A DEVICE

PRIORITY CLAIM

This patent application claims priority to German Patent Application No. 10 2015 220 229.1, filed 16 Oct. 2015, the disclosure of which is incorporated herein by reference in its entirety.

SUMMARY

Illustrative embodiments relate to a method and an apparatus for external use of a device, for example, of a vehicle.

BRIEF DESCRIPTION OF THE DRAWINGS

Disclosed embodiments are explained with reference to the associated drawings, in which.

DETAILED DESCRIPTION

Figure 1:
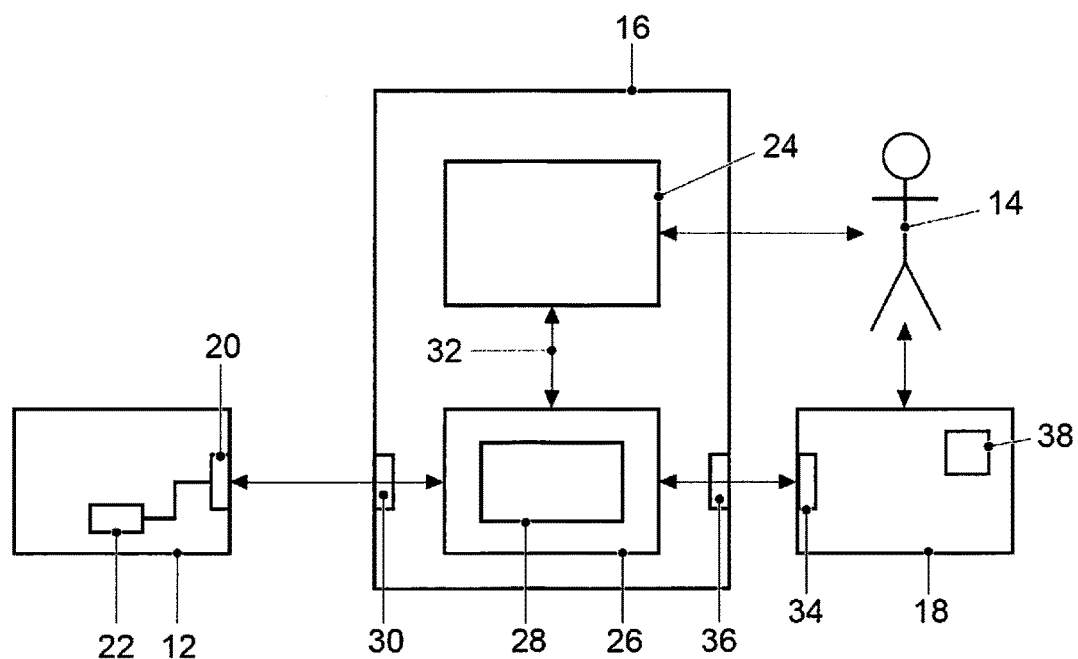
FIG. 1 shows a schematic representation of an apparatus for external use of a device.

At present, active assistance functions are being developed that involve the driver controlling the motion of his vehicle from the outside using a smartphone. Applications therefor are parking maneuvers or maneuvers with a trailer, for example. Benefits for the driver may be the use of especially tight parking spaces or a better overall view of the maneuver from the outside.

Smartphones are unsecure systems, however, especially in the interface between touchscreen as the central input element and an application being attackable/manipulable in various ways, both by the user and against him.

The communication relationship that is deemed unsecure within the smartphone can easily be compromised both by malware such as a virus or the like and by supplementary components that the user consciously installs, because operating systems used today provide few or no protective mechanisms in this regard and/or come from an open source background anyway and are therefore manipulable by anyone. Examples of possible effects of such manipulations are unexpected abnormal behavior by the vehicle, possibly with material and personal damage, nontransmission or delayed transmission of a stop command on account of disturbances or failures of the user interface, including as a result of interactions with other applications, and conscious override of a "dead man function", which is meant to guarantee continuous monitoring by the driver to allow unmonitored use, which is a misuse situation with a high potential for damage.

US 2013/0099892 A1 discloses an entry method for a vehicle in which a first mobile device sends an authorization verification to the vehicle. The first mobile device sends the authorization verification to a second mobile device, which is thus likewise allowed to enter the vehicle.

US 2014/169564 A1 discloses an entry method for a vehicle having a central key or certificate server that provides the vehicle and a mobile device, such as a smartphone or key fob, with entry data.

WO 2015/062832 A1 discloses an entry method for a vehicle in which the vehicle comprises two receivers, a first receiver for receiving identification data of a mobile device and a second receiver for detecting a vehicle key if the identification data are valid.

Disclosed embodiments increase the security of an entry method for a vehicle.

The disclosed method for external use of a device having a wireless communication interface by means of a program of a mobile device provides for external use to be possible only when a key device serving as an authentication token communicates with the program.

The disclosed method has the benefit that otherwise security-critical remote control can be secured in a simple manner. The device may be a vehicle, a machine, a crane, an agricultural implement or a home automation, for example. The mobile device may be a smartphone, a smartwatch, smart glasses, a wearable computer, a tablet or the like, for example. The key device may be a vehicle key, a key ring, a wallet or the like, for example. The external use can comprise setup of a communication link, starting or opening of the device, use of a component of the device, such as a navigation system of a vehicle, for example, and complete use of the device, such as driving a vehicle as in the case of a parking maneuver controlled from the outside, for example.

The key device can communicate with the mobile device via a short range wireless link. This may be what is known as near field communication (NFC), which is an international transmission standard for contactless interchange of data by radio technology over short distances of a few centimeters. This technology is more and more widely used, simple to implement and consumes relatively little power. In addition, the user of the key device and of the mobile device can stop remote control simply and quickly by moving the key device away from the mobile device, which interrupts the connection and hence also the remote control.

The key device can communicate with the device via the program. Hence, end-to-end communication between the device and the key device is possible. This allows implementation of the control of the connection or of the securing of the remote control in the vehicle. Alternatively, this can be effected in the mobile device or in the mobile device and in the device together.

The connection between the key device, the device and/or the mobile device may be secured. Securing or encryption increases security and prevents manipulations such as man in the middle attacks, for example. The key device itself may be secured, for example, by a certificate of the device manufacturer or the program maker.

The connection between the key device, the device and/or the mobile device may be secured by an asymmetric encryption method. Asymmetric encryption methods may be suitable for securing or encryption, since distribution by means of public key and certificates is possible in a simple and secure manner.

The presence of the key device can be checked by means of a repeatedly performed challenge-response authentication scheme. This method is repeated following setup of a connection between the key device and the mobile device or the device. This repetition may occur continuously, that is to say for as long as the connection is set up. Termination of the challenge-response authentication scheme means that the connection has been terminated or has become unsecure, as a result of which the remote control is then ended.

There may be provision for the external use not to be initiated and/or to be interrupted if there is no communication between the key device and the device and/or between the key device and the mobile device. This allows manipulations of the device to be effectively prevented, since remote control is possible only when a connection is uninterrupted and also still encrypted.

The device and the mobile device can communicate with one another using a Bluetooth Low Energy protocol. Devices and interfaces that are compatible with this protocol are widely used and consume little power. The range of up to approximately 10 meters is sufficient for supervised remote control.

There may be provision for the external use to be possible only when a dead man function of the key device is activated. This dead man function may be a simple pushbutton switch that needs to be kept depressed for remote control. As soon as the pushbutton switch is no longer activated, that is to say depressed, remote control is terminated. The key device, such as a vehicle key, for example, does not need to be equipped with an expensive and complex user interface, since this continues to be provided by the mobile device, such as a smartphone, for example.

The disclosed apparatus for external use of a device involves a mobile device having a program for external use of the device being provided, the device and the mobile device each having a wireless communication interface configured for communication between device and mobile device, a key device serving as an authentication token being provided, the key device and the mobile device each having a wireless communication interface configured for communication between key device and mobile device, and the mobile device and/or the device being configured so that external use is possible only when the key device communicates with the mobile device and/or the device. The same benefits and modifications as described above apply.

There may be provision for the device to be a vehicle. This application may be feasible, since a vehicle has all the technical equipment such as a communication unit, computer, i.e., controllers, etc. In addition, external control of the vehicle by the driver, for example, for parking maneuvers or maneuvers with a trailer, is feasible.

The key device can comprise a dead man function, such as a pushbutton switch. A simple pushbutton switch can implement this additional safety measure.

Further exemplary embodiments are obtained from the remainder of the features cited.

The various embodiments that are cited in this application are combinable with one another, unless stated otherwise on a case by case basis.

FIG. 1 shows an apparatus 10 for external use of a device, in this case, a vehicle 12. In this exemplary embodiment, the device is a vehicle, such as an automobile, truck, bus, motorcycle or a rail vehicle, aircraft or watercraft, for example. Alternatively, the device 12 may also be a construction or agricultural machine, a machine or a home automation. The vehicle 12 may be part of the apparatus or it may be external to the actual remote control apparatus.

If a user 14 now wishes to use the vehicle 12 externally, that is to say from the outside, then he can do so using a mobile device 16 and a key device 18. In this example, the mobile device 16 is a smartphone. It may also be a wearable computer such as a smartwatch, smart glasses or another smart item of clothing. Similarly, the mobile device may be a portable computer such as a tablet or the like. In this case, the key device 18 is an automobile key. Alternatively, the key device may be a keyring, a wallet or the like. The key device 18 bears this name, since it serves as an authentication token. A token is a hardware or software component for identifying and/or authenticating users. Terms such as electronic key or chip key can also be used.

The vehicle 12 has an interface 20 that the vehicle 12 can use to communicate with the outside. In this case, this bidirectional interface 20 is compatible with the Bluetooth Low Energy (BLE) standard. The vehicle 12 further comprises a controller 22 for controlling the communication and, if need be, further functions. The control may alternatively be integrated directly in the interface or interface unit. The interface 20 can be used to activate and/or use functions of the vehicle 12. As such, the vehicle 12 can be opened, for example, or functions such as navigation or air conditioning can be controlled from the outside. For the external use or control of highly safety-relevant functions, such as driving functions of the vehicle 12, for example, secured use is important. Externally used driving functions are used for parking maneuvers or maneuvering operations, with a trailer, for example.

The external use of the vehicle 12 is accomplished primarily via the mobile device 16, while the key device 18 undertakes a securing or security function. The mobile device 16 has an input element, in the present case a touchscreen 24, for the input of commands by the user 14 for controlling the vehicle 12 or one or more functions of the vehicle 12. The mobile device 16 has a computation unit 26, for example, a microprocessor, to process commands from the touchscreen 24 and to execute programs. A program 28 or an application is installed in the mobile device 16, for example, in the computation unit 26 or in a memory, not shown.

The program 28 is used for using the vehicle 12. To this end, the program 28 converts inputs from the user 14 that are made using the touchscreen 24 into control commands and sends the latter via an interface 30 to the vehicle 12. In the controller 22 of the vehicle 12, these commands are converted and corresponding control commands are forwarded to vehicle functions. Optionally, the controller 22 can check the commands for plausibility. The program can also run, at least in part, in the vehicle 12.

The interface 30 is compatible with the interface 20, for example, both interfaces are compatible with the Bluetooth Low Energy (BLE) standard. The communication or connection between the two interfaces 20 and 30 or between the vehicle 12 and the mobile device 16 is secured, that is to say encrypted, which means that the data to be transmitted cannot be manipulated and it is also not possible for other data to be loaded from the outside. Symmetric and asymmetric encryption methods are suitable as encryption. The program 28 itself is also secured against manipulation.

By contrast, the connection 32 between the touchscreen 24 or another input element and the program 28 or the computation unit 26 cannot be secured. To prevent commands manipulated by malware, for example, which could cause damage to the vehicle 12, from being transmitted to the vehicle 12 and/or executed, the key device 18 is used.

The key device 18 has an interface 34 for connection to and communication with the mobile device 16, which likewise comprises an interface 36 compatible therewith. In the present case, the two interfaces are compatible with a Near Field Communication (NFC) standard. This means that a connection between the mobile device 16 and the key device 18 is made when the two devices are at a distance of approximately ten centimeters or less. Conversely, this means that the user 14 can break the connection if the key device 18 moves away from the mobile device 16 to an extent greater than the transmission range of the connection, that is to say approximately ten centimeters in the present case.

This connection between the key device 18 and the mobile device 16 is also encrypted, optionally using the identical encryption to the connection between the vehicle 12 and the mobile device 16. It is also possible for the key device 18 to set up a direct, encrypted connection to the vehicle 12.

The key device 18 can comprise a dead man switch 38 that needs to be depressed to use the vehicle 12. When the user 14 releases the dead man switch 38, remote control is immediately ended. Alternatively, a dead man function of this kind may also be integrated in the mobile device.

Figure 2:
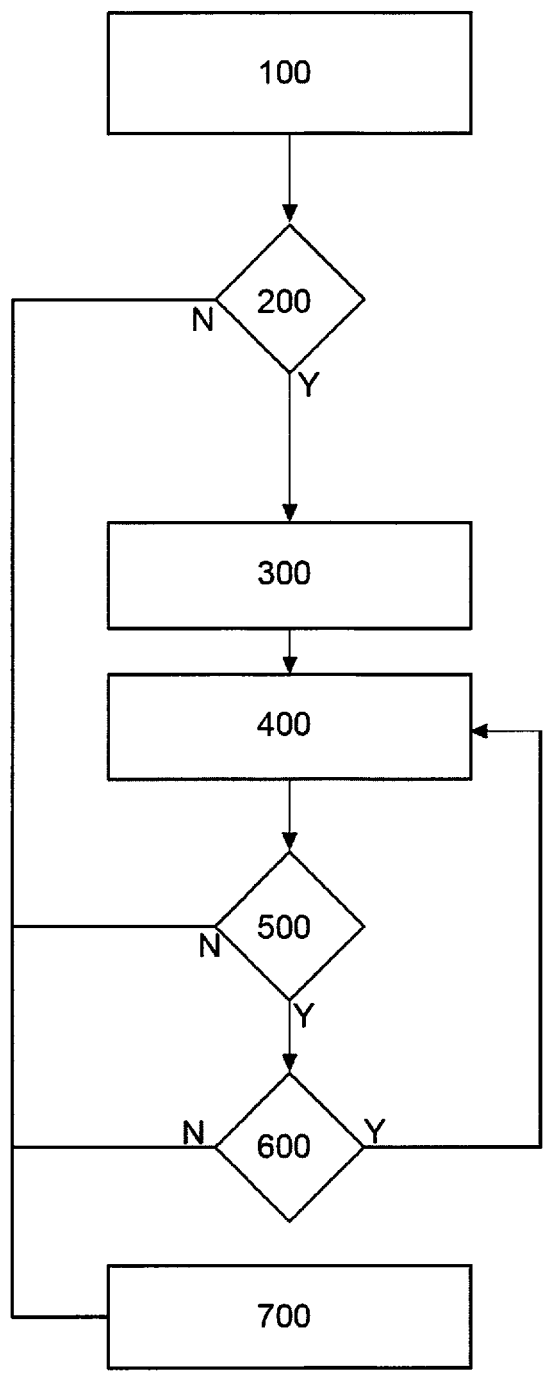
FIG. 2 shows a flowchart of a method for external use of a device.

A method for external use of the vehicle 12 is described below with reference to FIG. 2.

In a first operation at 100, the user 14 approaches the vehicle 12, that is to say within the range of the protocol used for the wireless communication interface 20 or 30.

In a further operation at 200, a check is performed to determine whether the key device 18 is close to the mobile device 16 and/or a secured connection can be set up between the key device 18 and the mobile device 16 or the program 28. If this is the case, then the process branches to a operation at 300.

In operation at 300, a connection is now set up between the vehicle 12 and the mobile device 16. This involves authorizations being checked, and an encrypted connection is set up. Alternatively, the operation of connection setup at 300 can be performed before operation at 200. Depending on the application or the desired security level, it is possible to establish whether or not the connection setup already requires a connection to the key device 18.

After the connection has been set up, a operation at 400 allows the external use of the vehicle 12 by the user 14 by means of the mobile device to be begun. This can involve the user 14 using the touchscreen 24 and the program 28 to control the vehicle 12. This external use is possible only if the two tests or conditions below are satisfied, however.

In a operation at 500, a check is first of all performed to determine whether the key device 18 is close to the mobile device 16 and/or a secured connection has been set up between the key device 18 and the mobile device 16 or the program 28. To this end, in this example in the present case, the presence of the key device 18 is checked by means of a repeatedly performed challenge-response authentication scheme. If the key device 18 is close to the mobile device 16 or if a secured connection has been set up between the key device 18 and the mobile device 16, then the process branches to the second condition in a operation at 600.

In operation at 600, a check is performed to determine whether the dead man function, in the present case, the dead man switch 38, is activated. If this is the case, then the process branches back to operation at 400 and the external use can be continued further.

Hence, during the external use, one or, depending on the view, two monitoring operations take place. Firstly, the securing is monitored by the key device 18, and secondly, the presence of the user is monitored by means of the dead man function. Only if both conditions from the relevant operations at 500 and 600 are satisfied is it possible for the external use to be performed. It should be noted that the dead man function is optional. While the external use is carried out, a monitoring loop operates with the monitoring via the key device 18 and the optional monitoring by the dead man function.

In a operation at 700, the external use is terminated. This happens from operation at 200 when it is established therein that the key device 18 is not close to the mobile device 16 and/or it is not possible for a secured connection to be set up between the key device 18 and the mobile device 16 or the program 28. It is also possible to branch from operation at 500 to operation at 700 to terminate the external use if it is established that the key device 18 is not close to the mobile device 16 and/or a secured connection has not been set up between the key device 18 and the mobile device 16 or the program 28. These two operations at 200 and 500 reflect the same termination condition, namely the monitoring of correct, unmanipulated remote use using the key device 18.

It is also possible to branch from operation at 600 to operation at 700 to terminate the external use if it is established that the dead man function is not activated. The dead man function is the second monitoring function.

If one of the two monitoring functions is not working or is not performed, the external use is terminated. This allows secure external use of the vehicle 12 to be ensured.

LIST OF REFERENCE SYMBOLS

10 Apparatus for external use
12 Vehicle
14 User
16 Mobile device
18 Key device
20 Interface
22 Controller
24 Touchscreen
26 Computation unit
28 Program
30 Interface
32 Connection
34 Interface
36 Interface
38 Dead man switch
100 Operation
200 Operation
300 Operation
400 Operation
500 Operation
600 Operation
700 Operation

The invention claimed is:

1. A method for external use of a device having a wireless communication interface by a program of a mobile device, the method comprising:
   detecting when a key device serving as an authentication token communicates with the program of the mobile device; and
   enabling the external use of the device to be controlled by the mobile device only when the key device is communicating with the program of the mobile device,
   wherein the external use is enabled only while a dead man function of the key device remains activated,
   wherein the key device is a vehicle key and the device is a vehicle, and
   wherein the dead man function is a switch on the key device.

2. The method of claim 1, wherein the key device communicates with the mobile device via a short range wireless link.

3. The method of claim 1, wherein the key device communicates with the device via the program.

4. The method of claim 1, wherein the connection between the key device, the device and/or the mobile device is secured.

5. The method of claim 1, wherein the connection between the key device, the device and/or the mobile device is secured by an asymmetric encryption method.

6. The method of claim 1, further comprising checking a presence of the key device by a repeatedly performed challenge response authentication scheme.

7. The method of claim 1, wherein the external use is not initiated and/or is interrupted if there is no communication between the key device and the device and/or between the key device and the mobile device.

8. The method of claim 1, wherein the device and the mobile device communicate with one another using a Bluetooth Low Energy protocol.

9. The method of claim 1, wherein the device is a vehicle and the external use comprises one of starting, opening, or driving the vehicle.

10. An apparatus for external use of a device, the apparatus comprising:
   a mobile device having a program for external use of the device, wherein the device and the mobile device each have a wireless communication interface configured for communication between device and mobile device,
   a key device serving as an authentication token,
   wherein the key device and the mobile device each have a wireless communication interface configured for communication between key device and mobile device
   wherein the mobile device and the device are configured so that external use of the device controlled by the mobile device is initiated only when the key device communicates with the mobile device and/or the device, and
   wherein the key device comprises a dead man function,
   wherein the external use is possible only while a dead man function of the key device remains activated, and
   wherein the dead man function is a switch on the key device.

11. The apparatus of claim 10, wherein the device is a vehicle.

12. The apparatus of claim 10, wherein the device is a vehicle and external use comprises one of starting, opening or driving the vehicle.

13. A method for external use of a device having a wireless communication interface by a program of a mobile device, the method comprising:
   detecting when a key device serving as an authentication token communicates with the program of the mobile device; and
   enabling the external use of the device controlled by the mobile device only when the key device is communicating with the program of the mobile device,
   wherein the external use is enabled only while a dead man function of the key device remains activated, and
   wherein the dead man function is a switch on the key device.

* * * * *